United States Patent [19]

Takeda et al.

[11] 4,440,732
[45] Apr. 3, 1984

[54] HOLLOW GRANULAR PERCARBONATE

[75] Inventors: Tsuneshi Takeda; Kazuya Otsuji; Junichi Tamura; Yoshikazu Morii, all of Wakayama; Michio Higashiwaki, Sakai; Yoshitaka Nakatani, Wakayama, all of Japan

[73] Assignee: Kao Soap Co., Ltd., Tokyo, Japan

[21] Appl. No.: 277,547

[22] Filed: Jun. 26, 1981

[30] Foreign Application Priority Data

Jul. 4, 1980 [JP] Japan .................................. 55-91261

[51] Int. Cl.³ ....................... C01B 31/00; C01B 15/10
[52] U.S. Cl. ................................................. 423/415 P
[58] Field of Search ..................................... 423/415 P

[56] References Cited

U.S. PATENT DOCUMENTS

| 4,018,874 | 4/1977 | Mollard | 423/415 P |
| 4,118,465 | 10/1978 | Macafosse | 423/415 P |
| 4,118,466 | 10/1978 | Klebe et al. | 423/415 P |
| 4,146,571 | 3/1979 | Will et al. | 423/415 P |

FOREIGN PATENT DOCUMENTS

| 2234135 | 1/1924 | Fed. Rep. of Germany | 423/415 P |
| 568754 | 4/1945 | United Kingdom | 423/415 P |

Primary Examiner—Gary P. Straub
Attorney, Agent, or Firm—Flynn, Thiel, Boutell & Tanis

[57] ABSTRACT

A hollow granular percarbonate is disclosed wherein the granules are hollow and the shell thereof is made of a crystalline percarbonate, along with a process for the preparation thereof.

15 Claims, 4 Drawing Figures

HOLLOW GRANULAR PERCARBONATE

The present invention relates to a granular percarbonate having a novel shape and structure and a process for the production thereof. More particularly, the present invention relates to a stable, hollow, granular percarbonate having a high dissolution velocity and a capacity of being dissolved without leaving any dissolution residue, in which the disappearance of available oxygen after the storage for a long period of time is small, and a process for producing the hollow granular percarbonate having the above characteristic properties. Since the percarbonate is in the form of hollow granules, dehydrating properties of a slurry thereof in the course of the production and physical properties of the resulting powder are excellent.

Percarbonates are generally used alone or in combination with a surfactant or the like as oxygen-containing bleaching agents which do not generate a bad smell or poisonous gas in many cases. Bleaching powers of them are milder then those of chlorine-containing bleaching agents. They are often used, since they exhibit a well-balanced bleaching effect on colored cloths or figured cloths. In the bleaching of cloths, particularly colored cloths or figured cloths, not only a moderate bleaching power but also uniform bleaching of every portion of each cloth is indispensable; otherwise uneven bleaching and local decoloration are caused to seriously reduce the value of the cloth.

The percarbonates are generally prepared in the form of powders, spherulities or granules and used in the form of an aqueous solution of a concentration of several percent. In the immersion of a cloth in the aqueous solution, if the percarbonate has not been dissolved completely, the particles or granules of the percarbonate adhere to the cloth to cause the selective bleaching which invites uneven discoloration and, in an extreme case, damage of the cloth. Though such a disadvantage is not caused if the stirring is continued during the immersion of the cloth, the bleaching is effected by the immersion method or allowing-to-stand method in many cases. For avoiding those disadvantages, it is quite important to homogeneously dissolve the percarbonate.

For dissolving the crystalline percarbonate, the stirring must be continued for several minutes till the complete dissolution has been attained or particularly warm water must be used, since the primary particles of a diameter of larger than 1 mm have a very low dissolution velocity. For overcoming this inconvenience, there is an idea of using microcrystalline percarbonate. In order to obtain a sufficiently high dissolution velocity, the diameters of the microcrystals should be less than $100\mu$. However, it is quite difficult to handle the percarbonate of such a small crystal diameter.

Namely, in the storage, transportation and charging of fine powders which decompose exothermally such as percarbonate powders, dangers and difficulties are always unavoidable. Further, in using the same, the irritation of the throat or nose by the fine powder is also unavoidable. For improving the easiness of handling of such a microcrystalline percarbonate, ideas have been proposed such as a granulation process disclosed in the specification of Japanese Patent Publication (unexamined) No. 84,500/1975. However, the difficulty in handling, i.e. dehydration and drying, in the production of the fine powder has not been overcome at all.

After intensive investigations made for the purpose of obtaining a percarbonate having a large particle size and a high dissolution velocity, which two properties are contradictory to each other, the inventors have found percarbonate aggregates and a novel process for producing the percarbonate aggregates by the crystallization without any reduction in the dissolution velocity. The present invention has been completed on the basis of this finding.

The present invention provides a hollow granular percarbonate where the granules are hollow and the shell thereof is made of such a crystalline percarbonate. The present invention further provides a process for producing a hollow granular percarbonate characterized in that an aqueous solution of mother liquor containing 6.0–15.0 wt. % of a carbonate and 1.5–6.0 wt. % of hydrogen peroxide is prepared and then granular carbonate and an aqueous hydrogen peroxide solution are added thereto simultaneously or alternately in such a ratio that the carbonate in the composition of aqueous mother liquor solution is kept in the range of 6.0–15.0 wt. %, hydrogen peroxide therein is kept in the range of 1.5–6.0 wt. % and molar ratio of the carbonate to hydrogen peroxide is kept at a value of at least 2:3 to crystallize the percarbonate.

Figure 1:
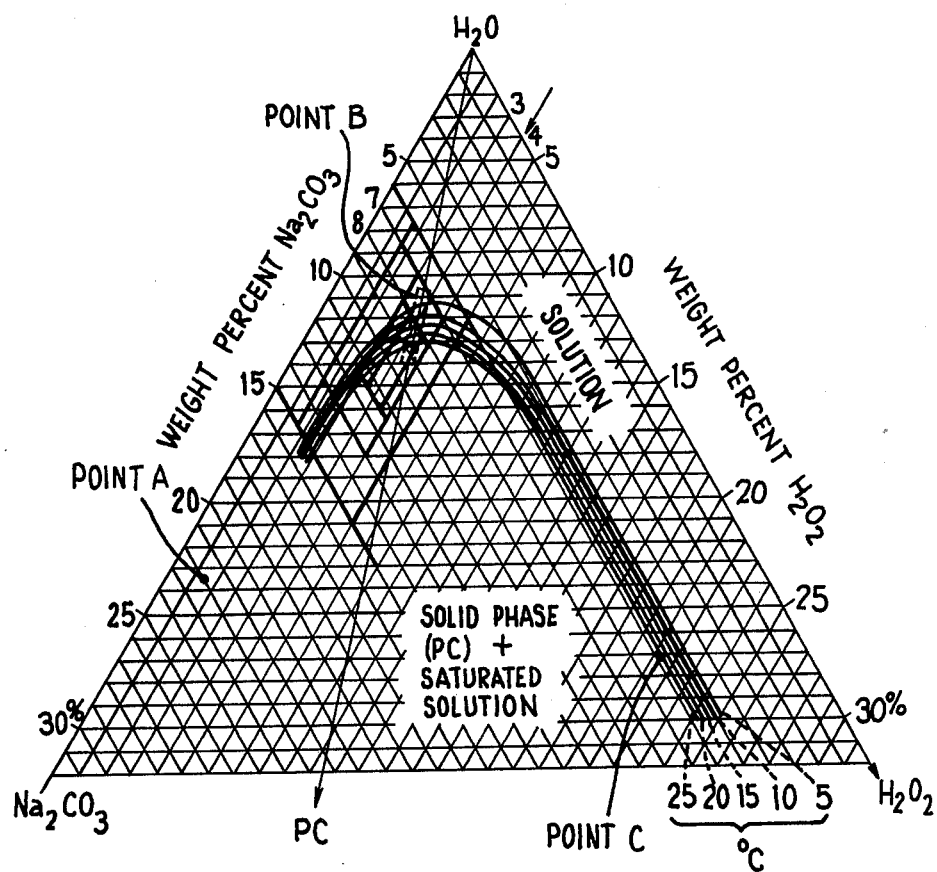
FIG. 1 is a triangular diagram of a composition comprising three components of sodium carbonate-hydrogen peroxide-water.

The process of the present invention for producing the hollow granular percarbonate will be illustrated with reference to sodium percarbonate. In case of sodium percarbonate, the hollow granules of the present invention are formed only near the point B in FIG. 1. FIG. 1 is a triangular diagram of three components, i.e. $Na_2CO_3$—$H_2O_2$—$H_2O$. Point B indicates a saturated solution of crystals (PC) having a composition of $Na_2CO_3 \cdot 1.5H_2O_2$. If this system is free from an influence of a concomitant salt or the like, it has the composition shown in Table 1.

TABLE 1

| Concentrations of $Na_2CO_3$ and $H_2O_2$ at the point B (free of concomitant salt) | | |
|---|---|---|
| Temp. (°C.) | $Na_2CO_3$ (wt %) | $H_2O_2$ (wt %) |
| 5 | 7.8 | 3.75 |
| 10 | 8.1 | 3.90 |
| 15 | 8.4 | 4.04 |
| 20 | 8.7 | 4.19 |
| 25 | 9.0 | 4.33 |
| 30 | 9.7 | 4.60 |

If the mother liquor has a higher $H_2O_2$ content than point B, the hollow granules are not formed. For example, if granular $Na_2CO_3$ and $H_2O_2$ solution are added simultaneously to a mother liquor having a composition at point C in FIG. 1 (6.0% $Na_2CO_3$, 21.2% $H_2O_2$) at 20° C., granules formed comprise unreacted $Na_2CO_3$ as cores on the surface of which the microcrystalline sodium percarbonate has been crystallized out. Thus obtained granules have a low available oxygen concentration, a hygroscopicity and a dissolution velocity far lower than that of the hollow granules, since unreacted $Na_2CO_3$ is contained therein.

Also in case the mother liquid has an excess $Na_2CO_3$ content above point B, the hollow granules are not formed. For example, if the same procedure as above is repeated using a mother liquor having a composition at point A in FIG. 1 (22.0% $Na_2CO_3$, 1.4% $H_2O_2$) at 20° C., merely microcrystalline sodium percarbonate is formed. Therefore, the filtration of the crystals becomes quite difficult and the drying is also not easy. Though thus obtained crystals have a high dissolution velocity and a nearly ideal amount of available oxygen because of their microcrystallinity, their practical values are poor in view of the physical properties of the powder.

Thus, the zone of mother liquor in which the hollow granular sodium percarbonate of the present invention is formed is limited in a very narrow range. More particularly, $Na_2CO_3$ and $H_2O_2$ concentrations must be in the ranges of 6.0–15.0% and 1.5–6.0%, respectively, and molar ratio of $Na_2CO_3$ to $H_2O_2$ must be at least 2:3. More preferably, $Na_2CO_3$ concentration and $H_2O_2$ concentration are 7.0–13.0% and 3.0–5.0%, respectively. The most preferred concentrations of them are 8.0–11.5% and 3.5–4.5%, respectively. The ratio of $Na_2CO_3$ to $H_2O_2$ to be added should be controlled so that the composition of the mother liquor is always maintained in said concentration ranges. If those conditions are satisfied, they may be added either simultaneously or alternately, and either continuously or intermittently. In view of the accuracy in the concentration control, it is most preferred, however, to add $Na_2CO_3$ and $H_2O_2$ simultaneously and continuously.

Rate of the addition should be such that $Na_2CO_3$ particles do not aggregate at the falling points and the composition of the mother liquor is not changed unfavorably over the above range to a composition which cannot be recovered immediately by stirring.

Causes of the remarkable change in crystal form of sodium percarbonate by the change of the composition of the mother liquor to points A, B and C as described above are related to the dissolution velocity of $Na_2CO_3$, precipitation velocity of sodium percarbonate and induction period till the precipitation.

The curves shown in FIG. 1 are those obtained under equilibrium conditions. In a reaction system to which $Na_2CO_3$ and $H_2O_2$ solution are continuously added as in the present invention, it is considered that the equilibrium is not attained. In this system, $Na_2CO_3$ dissolution occurs on the one hand and sodium percarbonate precipitation occurs on the other hand and, further, transient supersaturation state is observed. Microscopically, surfaces of the $Na_2CO_3$ granules added begin to be dissolved in the mother liquor. $H_2O_2$ concentration may be considered to be substantially uniform over the system, since the dissolution and diffusion of $H_2O_2$ are far more rapid than the dissolution of $Na_2CO_3$. On the other hand, the $Na_2CO_3$ dissolved is diffused from the granule surface. Heat of dissolution is delivered to the surroundings by the diffusion. After a given induction period, sodium percarbonate crystals are precipitated. The length of the induction period depends on the degree of supersaturation. At above mentioned point A, $H_2O_2$ concentration in the mother liquor is low and degree of supersaturation is low. Therefore, the induction period before the sodium percarbonate precipitation becomes long. In this period, the diffusing surface of $Na_2CO_3$ is broken to lose the original external shape of the granules. The higher the stirring speed of the system, the higher the breaking speed. As a result, the crystals formed are extremely fine.

At point C, the degree of supersaturation becomes high if $Na_2CO_3$ is dissolved even slightly, since $H_2O_2$ concentration in the mother liquor is high. Thus, the induction period before the sodium percarbonate precipitation is very short. Consequently, a film of sodium percarbonate is formed directly on the surface of $Na_2CO_3$. If the film of sodium percarbonate has once been formed, the invasion of water for dissolving $Na_2CO_3$ and the oozing-out of the $Na_2CO_3$ solution are inhibited and, therefore, the continuation of the reaction becomes difficult. As a result, the crystals thus form granules comprising unreacted $Na_2CO_3$ as cores coated with sodium percarbonate crystallized on the surface thereof.

Around point B, the $Na_2CO_3$ elution velocity is well-balanced with the induction period till the precipitation of sodium percarbonate. More particularly, sodium percarbonate is precipitated out before the diffusing surface of $Na_2CO_3$ eluted loses the original outer shape of the granules. An aperture is formed between the surface of $Na_2CO_3$ core and the sodium percarbonate precipitated out thereon, whereby the invasion of water and the oozing-out of $Na_2CO_3$ are not inhibited. Therefore, the microcrystals adhere to the inner and outer surfaces of the sodium percarbonate layer to increase its thickness. Thus, the elution of core $Na_2CO_3$ particles is completed and, consequently, hollow, perfect granules of sodium percarbonate are formed. The greatest characteristic feature of the process of the present invention is that the microcrystals of sodium percarbonate are formed properly so as not to break the diffusing surface for the dissolution and diffusion of the starting $Na_2CO_3$ core in the mother liquor.

From the viewpoint of the mechanism of the formation of such hollow granules, important factors are the stirring conditions, diameter of the starting granules and addition rates. On the other hand, concentration of the $H_2O_2$ solution to be added and the crystallization temperature may be left out of consideration.

Another important condition in the process of the present invention is that granular sodium carbonate of a size in a given range is added together with an aqueous hydrogen peroxide solution. As described above, the crystals of sodium percarbonate grow on the outer surface of the sodium carbonate granule (and partially on the inner surface of the same). Accordingly, the resulting hollow sodium percarbonate granule has a diameter slightly larger than the diameter of the starting sodium carbonate granule and the diameter of the internal cavity is the same as or a little smaller than the diameter of the starting sodium carbonate granule. Therefore, for obtaining such sodium percarbonate granules, the diameter of the starting sodium carbonate granules must be in the range of 50–2,000μ, preferably 100–1,000μ. If the diameter is smaller than 50μ, the granules having a sufficient hollowness cannot be obtained. If the diameter is larger than 2,000μ, it is difficult to completely dissolve the internal sodium carbonate and to obtain the perfect hollowness. The shape of the sodium carbonate granules is not limited to the sphere but they may be in any desired shape such as cubes and rectangular parallelepiped.

The stirring rate is preferably up to 100,000 Re, desirably up to 30,000 Re.

The resulting sodium percarbonate slurry may be taken from the crystallization system by any method. For example, the slurry may be drawn by a continuous method, a semi-continuous method wherein the slurry is drawn in portions and a batch method wherein the whole product is drawn after a given quantity of sodium percarbonate has been precipitated.

The concentration of the sodium percarbonate crystals in the mother liquid is also an important factor. If the concentration is excessive, the $Na_2CO_3$ diffusing surface is apt to be broken in the crystallization of sodium percarbonate and the resulting granules are impinged against each other and broken, thereby increasing the amount of fine powders formed.

The highest limit of the concentration is 40 wt. %, preferably 30 wt. %. Though there is not theoretical lowest limit, practically a concentration above 10 wt. % is preferred, because a device of a large size is required at a low concentration.

The formation of the hollow granules is completed in several minutes. It is desirable, however, to further age the granules for about 10 minutes to three hours. By this treatment, the disturbance of the filtration due to extremely fine crystals formed in the bulk, the formation of dust and acceleration of the decomposition can be prevented and, in addition, the reaction of unreacted $Na_2CO_3$ can be completed. In case the slurry is drawn from the crystallization device semi-continuously or continuously, it is efficient to provide a separate aging device. In this case, the average residence time in the crystallization device is 10 minutes to three hours, desirably 30 minutes to two hours, and the average residence time in the aging device is 10 minutes to three hours, desirably 30 minutes to one hour. If the temperature in the aging device is maintained at a point lower than the temperature in the crystallization device by up to 30° C., desirably by 5°–15° C., the $H_2O_2$ decomposition in the mother liquor is inhibited to give a preferred result. Further, by the temperature difference, fresh sodium percarbonate crystals deposit on the surface of the hollow sodium percarbonate granule to increase the thickness thereof, thereby improving the strength of the same.

In addition, in the removal of heat generated in the crystallization, a part of the load can be charged from the crystallization device to improve the cooling efficiency. For controlling all of the residence time, the concentration of sodium percarbonate in the mother liquor and the composition of the mother liquor in the above continuous or semi-continuous crystallization, it is insufficient to control the addition rates of $Na_2CO_3$ and $H_2O_2$ and the precipitation rate from sodium percarbonate slurry. It is necessary to add water or mother liquor of a constant composition to the crystallization device independently in addition to $H_2O_2$ and $Na_2CO_3$ or to remove them therefrom. The control can be effected most effectively by recycling the filtrate formed by the dehydration of the slurry after the crystallization and aging. The mass balance of the system becomes complete by further employing a technique of increasing or reducing the quantity of the mother liquor in the recycle flow as occasion demands.

In the batch crystallization, the composition and quantity of the dehydrated filtrate are controlled as occasion demands and then sent into the next cycle. In the recycle of the dehydrated mother liquor of the slurry, it is effective to lower the temperature thereof to a point lower than that in the aging tank for preventing the decomposition of sodium percarbonate in the mother liquor and also for distributing the load of the heat of crystallization. However, if the difference in temperature is too large, additional hydrate crystals of sodium percarbonate or $Na_2CO_3$ are formed to make the handling difficult. The difference in temperature from the aging device should be controlled to up to 20° C., preferably 10° C.

As described above, the process of the present invention for producing hollow granular percarbonate is based on a novel principle unknown in the art. The granular percarbonate salt obtained by the direct crystallization is in the form of hollow granules. The shell of the granules is made of the crystalline percarbonate. The shell has a structure of an aggregate of the growing percarbonate. The state of the crystals is variable depending on the crystallization conditions. When a silicate is used as a crystal habit modifier, needle crystals are obtained. When an aminopolycarboxylic acid salt is used as the crystal habit modifier, plate crystals are increased in amount. Though the size of the percarbonate varies depending on the size of the carbonate granules added, the percarbonate granules having an average diameter of 100–2,000$\mu$ are obtained favorably.

The hollow percarbonate granules of the present invention can be extremely readily dehydrated or handled because of the crystalline, hollow structures thereof. As compared with spherulites or granular crystals having no hollowness, the granules of the invention have a far higher dissolution rate. The time required for the complete dissolution is approximately $\frac{1}{3}$ to 1/5 of that required for the complete dissolution of the ordinary percarbonate granules.

In the specification of British Pat. No. 568,754, there is disclosed a process for the production of a percarbonate by crystallization which process is similar to that of the present invention. This process is similar to that of the present invention in that anhydrous or crystalline sodium carbonate and an aqueous hydrogen peroxide solution are added simultaneously or alternately to a mother liquor to obtain sodium percarbonate. However, the composition of the mother liquor in the crystallization step is different from that of the present invention in concentration. Further, size of the sodium carbonate granules to be added is not particularly limited to a given size. In addition, the specification of said British patent is silent on the above described characteristic technique of the present invention. Therefore, the crystalline, hollow granules of the present invention cannot be obtained by said process.

In the production of the hollow percarbonate granules based on the above novel principle, a phosphate such as sodium tripolyphosphate or sodium metaphosphate, or a silicate such as sodium metasilicate may be used as a stabilizer for the percarbonate. If the stabilizer is used in combination with a magnesium salt, preferably magnesium sulfate, the stabilization effect on the percarbonate is increased synergistically. The effect is increased with concentration. However, there is provided the highest limit in the concentration of the stabilizer. If more than 250 mmol Si of the silicate, per Kg of the carbonate, is added, needle microcrystalline carbonate is formed in a large amount in addition to the hollow granules, thereby degrading the dehydrating properties of the slurry and physical properties of the percarbonate. If more than 500 mmol Si of the silicate, per Kg of the carbonate, is added, the dissolution rate of the percarbonate granules becomes very low and the essential characteristic feature of the invention cannot be obtained. The same phenomenon as above is observed up to 500 mmol P of the phosphate per Kg of the carbonate. With a larger amount of the phosphate, the formation of the hollow granules is inhibited unlike the case of the silicate. In this case, the characteristic feature of the present invention also cannot be obtained. From those facts, the preferred amounts of the silicate and/or phosphate are up to 500 mmol Si and/or 500 mmol P per kilogram of the carbonate, preferably 20-100 mmol Si and/or 20-100 mmol P per kilogram of the carbonate. It has been well known that as the amount of the magnesium salt is increased, insoluble matter is formed which exhibits an ill effect. In carrying out the present invention, the amount of the magnesium salt is up to 150 mmol Mg, preferably 10-50 mmol Mg, per kilogram of the carbonate.

As the amount of the stabilizer is increased, the stability of the percarbonate is improved as described above. However, if the amount of the stabilizer is excessive in the production of the hollow granular percarbonate according to the present invention, the shape and the crystallizability thereof fall into disorder and the dissolution rate thereof is lowered unfavorably. This defect can be overcome by adding Na, Ca or Mg salt of ethylenediamine tetraacetic acid (hereinafter referred to as EDTA) to effect the crystallization of the percarbonate in the presence of Na, Ca or Mg salt of EDTA. By this treatment, the deterioration of the crystallizability due to the large amount of the stabilizer added can be prevented and the dissolution rate thereof is also recovered to the rate obtained when a small amount of the stabilizer is added. Na, Ca or Mg salt of EDTA acts as a crystal habit modifier which modifies the crystallizability of the percarbonate to realize the high solubility again. The amount of the modifier varies in the range of 0.5-250 mmol, preferably 2-50 mmol, per kilogram of the carbonate depending on the concentration of the stabilizer added.

Though those EDTA salts have been known as stabilizers for the percarbonates, the phenomenon indicating the action thereof to improve the crystallizability of the hollow percarbonate granules as in the process of the present invention has not been known yet. It will be apparent from the following examples that the principal object of using the EDTA salts in the process of the present invention is not only to obtain the effects thereof as the stabilizer but also to improve the crystallizability of the percarbonate.

The following examples further illustrate the present invention.

EXAMPLE 1

To 408.1 g of a mother liquor comprising 8.8 wt.% of sodium carbonate, 4.4 wt. % of hydrogen peroxide and the remainder of water, there were added 131.0 g of 50% hydrogen peroxide solution and 118.3 g of granular anydrous sodium carbonate, which were passed through a 70 mesh sieve but remains on a 100 mesh sieve, simultaneously and continuously, at given rates for 30 minutes while the stirring was continued with stirring blades of a diameter of 6 cm at a rate of 33.8 rpm. The Reynolds number was $2.0 \times 10^3$. The temperature of the mother liquor was controlled externally to $20.0° \pm 0.1°$ C.

After completion of the addition of hydrogen peroxide and sodium carbonate, the aging was effected for an additional 15 minutes under the same conditions as above. The resulting slurry was dehydrated by centrifugation under 900 G for 3 minutes to obtain 182.4 g of a cake and 424.8 g of recovered mother liquor. The concentrations of hydrogen peroxide and sodium carbonate in the mother liquor recovered were 4.58 and 7.21 wt. %, respectively. The cake was dried with air at 60° C. for 2 hours to obtain 153.0 g of white crystalline granules.

Figure 2:
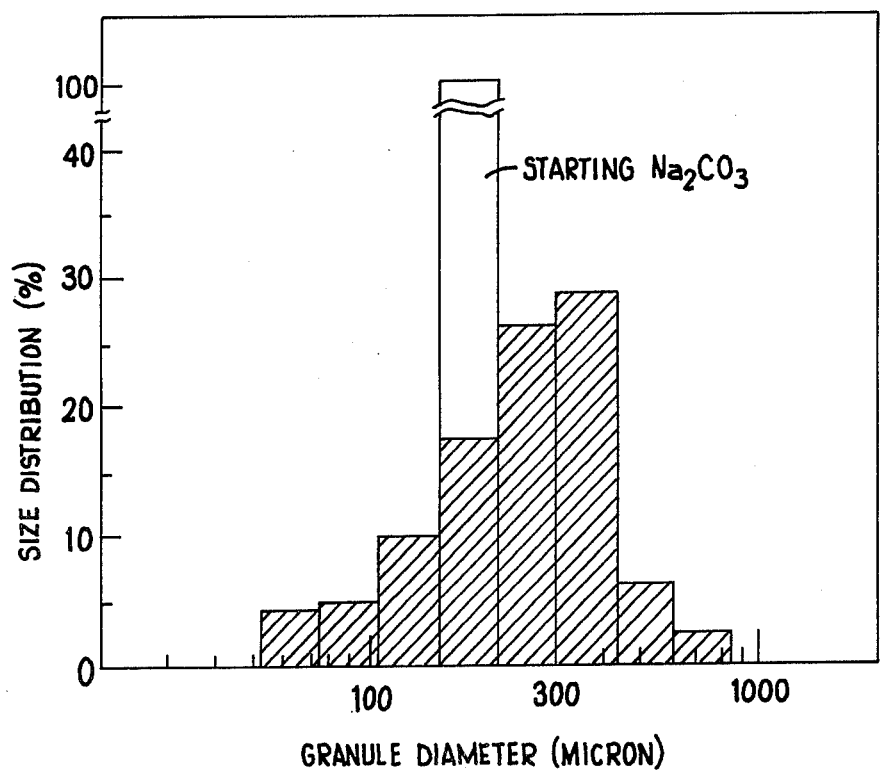
FIG. 2 is a graph showing size distributions of sodium carbonate used as starting material in Example 1 and resulting granules.

Most of the resulting granules were hollow and the presence of crystalline fine powders and aggregated particles was observed therein. The size distribution of the granules is shown in FIG. 2 by the bars with oblique lines. The size distribution of starting sodium carbonate is also shown therein. The weight-average diameters of the starting sodium carbonate and the resulting sodium percarbonate granules were $180\mu$ and $240\mu$, respectively. The sodium percarbonate granules had an average oxygen concentration of 14.7% and an apparent density of 0.45 g/cm$^3$. 2 g of the granules was dissolved in 20 ml of water under stirring in a petri dish having a diameter of 5 cm. 27 Seconds were required for the complete dissolution. The temperature of the water was 20° C., the stirring rod had a length of 3 cm and a diameter of 0.6 cm and stirring rate was 300 rpm. On the other hand, the dissolution time of commercially available sodium percarbonate (non-hollow sodium percarbonate granules having an average diameter of $220\mu$ and an apparent density of 0.72 g/cm$^3$) was measured under the same conditions as above and was determined to be 165 seconds.

EXAMPLE 2

To 424 g of a mother liquor comprising 9.6 wt. % of sodium carbonate, 4.4 wt. % of hydrogen peroxide and the remainder of water, 62.1 g of 58% aqueous hydrogen peroxide solution and 76.5 g of granular anhydrous sodium carbonate which passed through a 24 mesh sieve but remained on a 32 mesh sieve were alternately and separately added in 30 portions each in such a manner that 2.55 g of Na$_2$CO$_3$ and 2.07 g of 58% hydrogen peroxide are added at a time over 60 minutes. The rate of addition thereof was such that the concentrations of sodium carbonate and hydrogen peroxide in the mother liquor were maintained in the ranges of 9.2–10.5% and 3.8–4.5%, respectively. In this step, the stirring was continued with stirring blades having a diameter of 6 cm at a rate of 83.5 rpm. The Reynolds number was $1.0 \times 10^4$. The temperature of the mother liquor was controlled to $25° \pm 0.1°$ C. by external cooling. After completion of the addition of the aqueous hydrogen peroxide solution and sodium carbonate, the aging was effected for an additional 30 minutes at the same temperature at the same stirring rate as above.

The resulting slurry was dehydrated by centrifugation under 900 G for 3 minutes to obtain 95.5 g of a cake and 451.7 g of the mother liquor recovered. The concentrations of hydrogen peroxide and sodium carbonate in the mother liquor recovered were 4.05 and 10.15 wt. %, respectively. The cake was dried with air at 60° C. for two hours to obtain 78.3 g of white crystalline granules.

Figure 3:
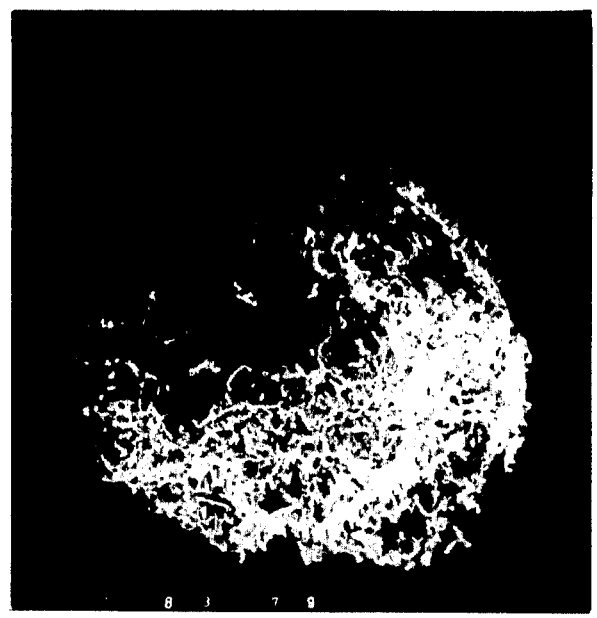
FIGS. 3 and 4 are scanning electron micrographs of the hollow granules obtained in Example 2, FIG. 3 being a photograph of the exterior of a granule and FIG. 4 being that of a cross section thereof.
Figure 4:
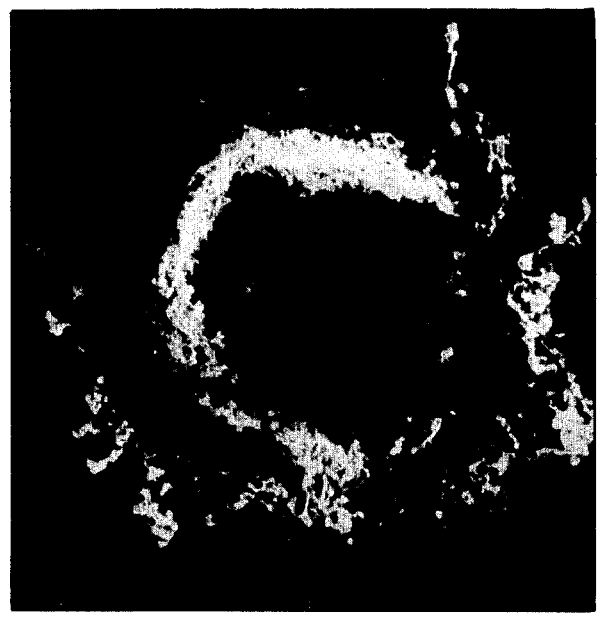

Scanning electron micrographs (100 × magnification) of a typical granule are shown in FIGS. 3 and 4. FIG. 3 is a photograph of the exterior of the granule and FIG. 4 is that of a cross section thereof. From an X-ray diffraction of pattern, it was identified with sodium percarbonate. The product had an available oxygen concentration of 13.8%, a weight-average granule diameter of 480μ and an apparent density of 0.44 g/cm³. The dissolution time of the granules were determined in the same manner as in Example 1. The granules were completely dissolved in 61 seconds.

COMPARATIVE EXAMPLE 1

To 416 g of a mother liquor (point A in FIG. 1) comprising 22.0 wt. % of sodium carbonate, 1.4 wt. % of hydrogen peroxide and the remainder of water, there were added 75.2 g of 50% aqueous hydrogen peroxide solution and 85.9 g of granular anhydrous sodium carbonate which passed through a 24 mesh sieve but remained on a 32 mesh sieve, simultaneously and continuously at constant rates over 60 minutes. In this step, the stirring was continued with stirring blades having a diameter of 6 cm at a rate of 169 rpm. The Reynolds number was $1.0 \times 10^4$ during the stirring. The temperature of the system was maintained at $25.0° \pm 0.1°$ C. by external cooling. After completion of the addition of the aqueous hydrogen peroxide solution and sodium carbonate, the aging was effected for additional 60 minutes under the same conditions as above. The resulting slurry was dehydrated by centrifugation under 900 G for three minutes to obtain 195.6 g of a cake and 368.7 g of the mother liquor recovered. The concentrations of hydrogen peroxide and sodium carbonate in the mother liquor recovered were 1.92 wt. % and 19.3 wt. %, respectively. The cake was dried with air at 60° C. for two hours to obtain 136.5 g of white powder. The powder comprised microcrystals and the presence of hollow granules was not recognized therein at all. The product had an available oxygen concentration of 11.7%, an average diameter of the primary particles of less than 80μ and an apparent density of 0.37 g/cm³.

COMPARATIVE EXAMPLE 2

To 424.0 g of a mother liquor (point C in FIG. 1) comprising 6.0 wt. % of sodium carbonate, 21.2 wt. % of hydrogen peroxide and the remainder of water, there were added 107.2 g of 58% aqueous hydrogen peroxide solution and 84.2 g of granular anhydrous sodium carbonate which passed through a 70 mesh sieve but remained on a 100 mesh sieve simultaneously at constant rates over 60 minutes. In this step, the stirring was continued with stirring blades having a diameter of 6 cm at a rate of 11.5 rpm.

The Reynolds number was $2.0 \times 10^3$ in this step. The temperature of the mother liquor was maintained at $25.0° \pm 0.1°$ C. by external cooling. After completion of the addition, the aging was effected for an additional 60 minutes under the same conditions as above. The resulting slurry was dehydrated by centrifugation under 900 G for three minutes to obtain 93.6 g of a cake and 483.5 g of the mother liquor recovered. The concentrations of hydrogen peroxide and sodium carbonate in the mother liquor recovered were 21.5 wt. % and 4.8 wt. %, respectively. The cake was dried with air at 60° C. for two hours to obtain 89.0 g of dry cake. The cake comprised white granules which were not hollow and had a double structure containing unreacted sodium carbonate core. The product had an available oxygen concentration of 5.3% which was far lower than those of other cases and an apparent density of as high as 1.04.

COMPARATIVE EXAMPLE 3

To 1500 g of a mother liquor comprising 8.8 wt. % of sodium carbonate, 4.2 wt. % of hydrogen peroxide and the remainder of water, there were added 237 g of 58% aqueous hydrogen peroxide solution and 287 g of granular anhydrous sodium carbonate which passed through a 16 mesh sieve but remained on a 200 mesh sieve. The addition of the two components was initiated at the same time and they were added at constant rates. The addition of hydrogen peroxide was completed in 30 minutes and the addition of sodium carbonate was completed in 60 minutes. In the initial stage (30 minutes) after the starting of the addition, the ratio of sodium carbonate to hydrogen peroxide was lower than that required for the formation of sodium percarbonate. Therefore, the hydrogen peroxide concentration in the composition of the mother liquor increased gradually. For example, the mother liquor 15 minutes after the initiation of the addition comprised 7.4% of sodium carbonate and 7.0% of hydrogen peroxide, and the mother liquor 30 minutes after the initiation comprised 6.2% of sodium carbonate and 9.2% of hydrogen peroxide. Therefore, it is considered that the major part of the sodium percarbonate formation reaction was carried out in a region of a higher hydrogen peroxide concentration which was outside the region of the mother liquid composition of the present invention. After completion of the addition, the aging was effected for additional 30 minutes. Over the whole period, the temperature was controlled to $20° \pm 0.1°$ C. by external cooling. The stirring was effected with stirring blades having a diameter of 5.5 cm at 95 rpm.

The resulting slurry was dehydrated by centrifugation under 900 G for three minutes to obtain 368.6 g of a cake and 1650 g of the mother liquor. The final composition of the mother liquor comprised 8.2% of sodium carbonate, 9.0% of hydrogen peroxide. The cake was dried at 60° C. for 90 minutes to obtain 324 g of white granules in which the presence of hollow granules was hardly observed therein. The granules were substantially non-hollow granules containing unreacted sodium carbonate granule as the core. The product had an available oxygen concentration of 6.8% and an apparent density of 0.98.

EXAMPLE 3

Hollow sodium percarbonate granules were produced using a crystal habit modifier. An additive used in this example was an aqueous solution containing 15.0 wt. % of magnesium sulfate and/or 42.0 wt. % of 4Na.EDTA and/or 38.0 wt. % of No. 3 sodium silicate. The additive was previously added to the mother liquor as follows: 192 of granular anhydrous sodium carbonate was dissolved in about 1100 g of ion-exchanged water under stirring. 102.5 g of 60% aqueous hydrogen peroxide solution was added to the solution and then 9.92 g of No. 3 sodium silicate (38% product) and/or 6.43 g of 4Na.EDTA (42% product) and/or 12.5 g of magnesium sulfate (15% product) were added successively at need. Finally, ion exchanged water was added thereto to make the whole quantity 1500 g. When magnesium sulfate was added, it was added slowly under stirring so as to inhibit the formation of white precipitates. The mother liquor was added with 252.6 g of granular anhydrous sodium carbonate of 100–24 mesh and 202.5 g of 60.0% aqueous hydrogen peroxide solution simultaneously over 90 minutes. In this step, the stirring was continued at a rate of $1.0 \times 10^4$ Re. The resulting slurry was dehydrated by centrifugation under 900 G for three minutes and the thus-obtained cake was dried at 60° C. for 120 minutes.

The granules obtained as above were white, crystalline and hollow. In addition, a considerable amount of microcrystals was formed. The shape of the microcrystals was observed by means of a scanning electron microscope. The dehydrating properties of the cake varied depending on the shape of the microcrystals. The plate crystals were preferred to the needle crystals. The results obtained are shown in Table 2.

TABLE 2

| Sample No. | | 1 | 2 | 3 | 4 |
|---|---|---|---|---|---|
| Concs. of additives ($mmol/Kg\ Na_2CO_3$) | magnesium sulfate | 0 | 35 | 0 | 35 |
| | No. 3 Sodium silicate (mol number of Si) | 0 | 105 | 0 | 105 |
| | EDTA.4Na | 0 | 0 | 16 | 16 |
| Shape of microcrystals other than the hollow granules | | needle | needle | plate | plate |
| Available oxygen content of sodium percarbonate (wt %) | | 14.0 | 14.0 | 14.5 | 14.4 |
| Water content of cake (wet basis, wt %) | | 16.4 | 19.1 | 9.7 | 10.9 |

The embodiments of the invention in which an exclusive privilege or property is claimed are defined as follows:

1. A process for preparing sodium percarbonate in the form of hollow granules, consisting essentially of the steps of:

forming an aqueous reaction solution consisting essentially of 6.0 to 15.0 wt. % of dissolved $Na_2CO_3$, 1.5 to 6.0 wt. % of dissolved hydrogen peroxide and the balance is essentially water;

then adding gradually to said aqueous reaction solution amounts of (1) granules of anhydrous sodium carbonate having particle sizes in the range of 50 to 2000 microns and (2) an aqueous hydrogen peroxide solution, at rates effective to continuously maintain (a) the concentration of dissolved hydrogen peroxide in said reaction solution in the range of 1.5 to 6.0 wt. %, (b) the concentration of said dissolved $Na_2CO_3$ in said reaction solution in the range of 6.0 to 15.0 wt. %, and (c) a molar ratio of said dissolved $Na_2CO_3$ to dissolved hydrogen peroxide in said reaction solution at a value of at least 2:3, whereby to convert said anhydrous sodium carbonate to sodium percarbonate and to precipitate said sodium percarbonate in the form of hollow granules.

2. A process as claimed in claim 1, wherein said aqueous hydrogen peroxide solution and said granules of said anhydrous sodium carbonate are added so that the concentration of dissolved hydrogen peroxide in said reaction solution is maintained in the range of 3.0 to 5.0 wt. % and the concentration of said dissolved $Na_2CO_3$ in said reaction solution is maintained within the range of 7.0 to 13.0 wt. %.

3. A process as claimed in claim 2, wherein said concentration of said dissolved hydrogen peroxide is maintained within the range of 3.5 to 4.5 wt. %, and said concentration of said dissolved $Na_2CO_3$ carbonate compound is maintained within the range of 8.0 to 11.5 wt. %.

4. A process as claimed in claim 2, further comprising stirring said aqueous reaction solution during said gradual addition of said granules of said anhydrous sodium carbonate and said aqueous hydrogen peroxide solution at a stirring rate of up to 100,000 Re.

5. A process as claimed in claim 1, further comprising the steps of gradually withdrawing a slurry consisting essentially of a portion of said hollow granules of crystallized sodium percarbonate and a portion of said aqueous reaction solution; then aging said slurry at a temperature which is lower than the temperature of said aqueous reaction solution by a temperature difference of up to 30° C., whereby fresh crystals of said sodium percarbonate deposit on the surface of said hollow granules and thereby enlarge said hollow granules during said aging step.

6. A process as claimed in claim 1, wherein said granules of said anhydrous sodium carbonate and said aqueous hydrogen peroxide solution are added simultaneously and continuously to said reaction solution, further comprising the step of removing a portion of said hollow granules of crystallized sodium percarbonate from said aqueous reaction solution during said gradual addition of said granules of said anhydrous sodium carbonate and said aqueous hydrogen peroxide solution.

7. A process as claimed in claim 1, claim 2 or claim 6, wherein said reaction solution contains one or more stabilizers selected from the group consisting of phosphate stabilizers, silicate stabilizers, and Na, Ca or Mg salts of ethylenediamine tetraacetate.

8. A process as claimed in claim 7, wherein said phosphate stabilizer is selected from the group consisting of sodium tripolyphosphate and sodium metaphosphate, and said silicate stabilizer is sodium metasilicate.

9. A process for preparing sodium percarbonate in the form of hollow granules, consisting essentially of the steps of:

(a) forming an aqueous reaction solution consisting essentially of 6.0 to 15.0 wt. % of dissolved $Na_2CO_3$, 1.5 to 6.0 wt. % of dissolved hydrogen peroxide and the balance is essentially water;

(b) adding gradually to a reaction vessel containing said aqueous reaction solution amounts of (1) granules of anhydrous sodium carbonate having a granule size in the range of 50 to $2000\mu$ and (2) an aqueous hydrogen peroxide solution, at rates effective to continuously maintain (a) the concentration of said dissolved $Na_2CO_3$ in said aqueous reaction solution in the range of 6.0 to 15.0 wt. %, (2) the concentration of said dissolved hydrogen peroxide in said aqueous reaction solution in the range of 1.5 to 6.0 wt. %, and (c) a molar ratio of said dissolved $Na_2CO_3$ to said dissolved hydrogen peroxide in said reaction solution at a value of at least 2:3 whereby to convert said anhydrous sodium carbonate to sodium percarbonate and to precipitate said sodium percarbonate as hollow granules wherein the amount of said hollow sodium percarbonate granules present in said aqueous reaction solution does not exceed 40 wt. %, based on the total weight of said aqueous reaction solution;

(c) withdrawing gradually a slurry consisting essentially of a portion of said hollow granules of sodium percarbonate and a portion of said reaction solution from said reaction vessel and feeding same into an aging vessel maintained at a temperature lower than the temperature in said reaction vessel by a temperature difference of up to 30° C;

(d) aging said slurry in said aging vessel; then (e) recovering said hollow granules of sodium percarbonate from said slurry and simultaneously recovering a mother liquor; then (f) recycling a portion of said mother liquor, which mother liquor is at a temperature lower than the temperature in said aging vessel by a temperature difference of up to 20° C., to said reaction vessel; and (g) repeating the foregoing steps (b) to (f), until a sufficient quantity of said hollow granules of sodium percarbonate has been produced.

10. A process as claimed in claim 9, wherein the amount of said hollow granules of sodium percarbonate in said aqueous reaction solution is in the range of 10 to 30 wt. %, said aging vessel is maintained at a temperature of from 5° to 15° C. lower than the temperature in said reaction vessel, said mother liquor is at a temperature up to 10° C. lower than the temperature in said aging vessel, said slurry has an average residence time in said reaction vessel of from 10 minutes to 3 hours; and said slurry has an average residence time in said aging vessel of from 10 minutes to 3 hours.

11. A process as claimed in claim 9, wherein said reaction solution contains up to 500 mmol, per kilogram of said sodium carbonate, of each of one or more stabilizers selected from the group consisting of silicate stabilizers and phosphate stabilizers.

12. A process as claimed in claim 11, wherein said reaction solution further contains up to 150 mmol Mg, per kilogram of said sodium carbonate, of a magnesium salt.

13. A process as claimed in claim 12, wherein said stabilizers are selected from the group consisting of sodium tripolyphosphate, sodium metaphosphate, and sodium metasilicate, and said magnesium salt is magnesium sulfate.

14. A process as claimed in claim 11, wherein the amount of each of said stabilizers is 20 to 100 mmol, per kilogram of said sodium carbonate, and the amount of said magnesium salt is 10 to 50 mmol, per kilogram of said sodium carbonate.

15. A process as claimed in claim 11 or 12, wherein said reaction solution further contains 0.5 to 250 mmol of an Na, Ca or Mg salt of ethylenediamine tetraacetic acid, per kilogram of said sodium carbonate.

* * * * *